United States Patent [19]

Somers

[11] 4,283,594
[45] Aug. 11, 1981

[54] VACUUM APPARATUS HAVING PROTECTIVE DEVICE FOR OPERATOR AND METHOD

[75] Inventor: M. John Somers, Dayton, Ohio

[73] Assignee: Dayco Corporation, Dayton, Ohio

[21] Appl. No.: 104,617

[22] Filed: Dec. 17, 1979

[51] Int. Cl.³ ............................ A47L 9/24; A47L 9/28
[52] U.S. Cl. ........................................ 174/47; 15/377; 29/854
[58] Field of Search ........... 174/47; 15/327 R, 327 D, 15/327 E, 361, 377, DIG. 10; 29/825, 854, 855; 200/51 R, DIG. 37; 307/22; 318/471, 472; 339/15, 16 R; 361/103, 104

[56] References Cited

U.S. PATENT DOCUMENTS

| 3,493,815 | 2/1970 | Hurtle | 361/104 X |
| 3,636,285 | 1/1972 | Wickham et al. | 174/47 X |
| 4,168,564 | 9/1979 | Grabovez | 15/377 |

*Primary Examiner*—Laramie E. Askin
*Attorney, Agent, or Firm*—Charles E. Bricker; Reuben Wolk

[57] ABSTRACT

A vacuum hose assembly, method of making same, and vacuum cleaner using same are provided wherein the hose assembly has a chamber in at least one of a pair of hose connectors thereof wherein such chamber is readily opened and closed and a protective device is disposed within the chamber and electrically connected to the electrical circuit of the vacuum hose assembly and the device is sensitive to practically every type of fault capable of causing injury to humans and operates to interrupt the electrical circuit therethrough upon detection of a fault.

16 Claims, 3 Drawing Figures

U.S. Patent     Aug. 11, 1981     4,283,594
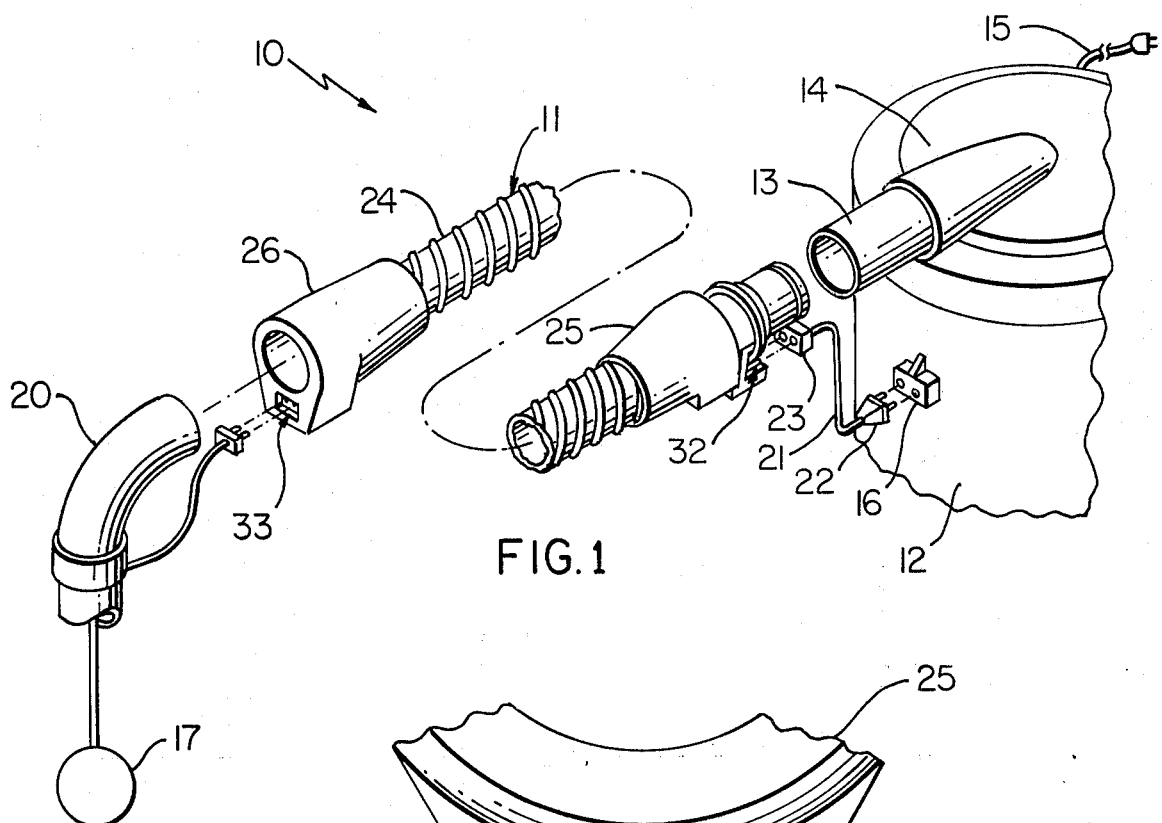
FIG.1
FIG.3
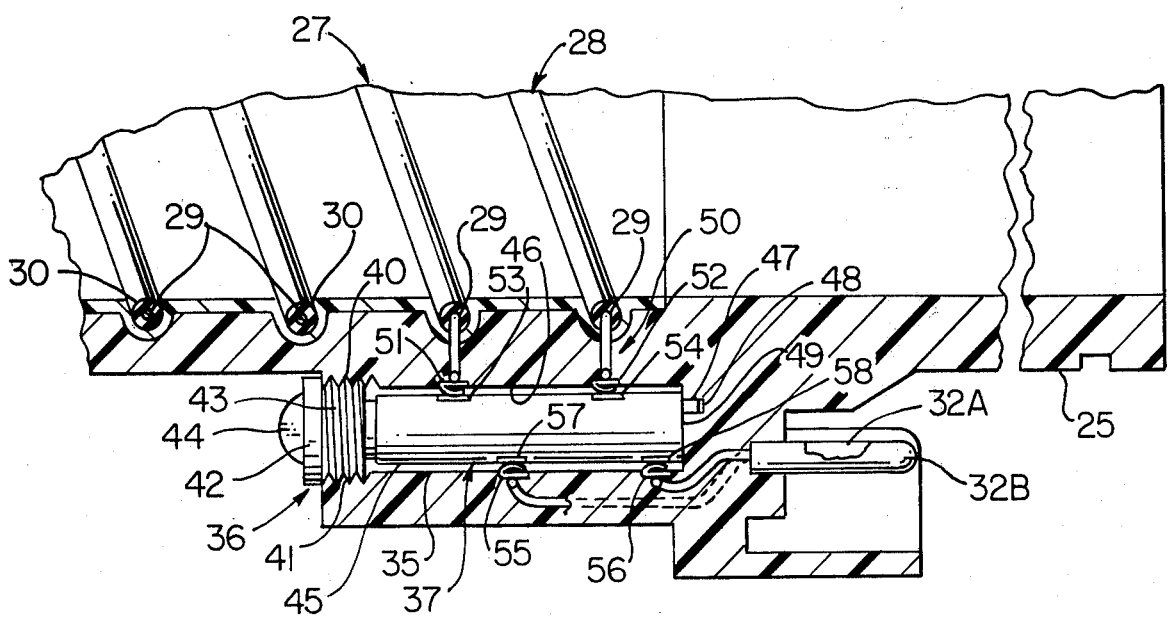
FIG.2

VACUUM APPARATUS HAVING PROTECTIVE DEVICE FOR OPERATOR AND METHOD

BACKGROUND OF THE INVENTION

1. Field of the Invention

This invention relates to canister type vacuum cleaners and in particular to a vacuum apparatus which has a protective device for protecting an operator using same against any injury likely to cause harm.

2. Prior Art Statement

Canister type vacuum cleaners are well known and each employs a vacuum tank having an electrically powered vacuum unit, an electric motor driven cleaning instrument for operation remote from the vacuum tank, and a vacuum hose assembly operatively connecting the cleaning instrument to the tank. The vacuum hose assembly used in this type of vacuum system usually has dual-purpose electrical conductors and reinforcing wires extending therealong for purposes well known in the art. However, in the normal operation of a vacuum cleaner, numerous electrical failures can occur in one or more components of such vacuum cleaner. Further, the vacuum cleaner may be intentionally or inadvertently operated on damp or wet floors. In the event of failure of an electrical component or operation of the vacuum cleaner on a damp or wet floor the risk of serious injury to an operator is great.

It is known to provide electrical protective devices on electrical equipment including on vacuum cleaners; however, the main thrust of most previous devices has been to protect the electrical equipment.

Electrical devices sensitive to practically every type of fault capable of causing injury to humans and serving to detect such fault while operating to interrupt a circuit therethrough upon detection of the fault have been proposed heretofore and such a device is disclosed in U.S. Pat. No. 3,493,815. It has also been proposed in U.S. Pat. No. 4,168,564 to provide a thermally actuated switch in the electrical circuit of a vacuum hose assembly wherein such switch breaks the electrical circuit through cooperating electrical leads of electrical system thereof once a predetermined temperature level is reached by the switch. In addition, it is known to provide a conventional fuse in a vacuum cleaning apparatus. Finally, it has also been proposed to provide a so-called portable ground fault circuit interrupter which consists of a portable box having a plug at one end for plugging into a grounded power supply and one or more female plugs therein for plugging tools therein.

SUMMARY

It is a feature of this invention to provide a vacuum hose assembly for a canister type vacuum cleaner wherein the hose assembly comprises a vacuum hose, a pair of hose connectors provided at opposite end portions of the hose, a pair of wires extending along the vacuum hose and serving the dual purpose of electrical conductors and hose reinforcing wires, an electrical connector associated with each hose connector and having the dual-purpose wires connected thereto, a chamber in at least one of the hose connectors provided with readily opened and closed access means for the chamber, and a protective device disposed within the chamber and electrically connected between an associated electrical connector and the wires, with the device being sensitive to and serving to detect practically every type of fault capable of causing injury to humans and operating to interrupt the circuit therethrough upon detection of such fault.

Another feature of this invention is to provide a vacuum hose assembly of the character mentioned wherein the device is an easily installed and removed cartridge.

Another feature of this invention is to provide a vacuum hose assembly of the character mentioned in which the above-mentioned chamber in a hose connector is a substantially right circular cylindrical chamber having one open end and the access means comprises thread means in the hose connector adjoining the open end and a simple closure member having cooperating threads which are adapted to be threadedly engaged with the threads of the hose connector.

Another feature of this invention is to provide a canister type vacuum cleaner which utilizes a vacuum hose assembly of the character mentioned.

Another feature of this invention is to provide a method of making a vacuum hose assembly of the character mentioned.

Therefore, it is an object of this invention to provide an improved vacuum hose assembly, method of making such hose assembly, and vacuum cleaner employing such hose assembly having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section, parts in elevation, parts broken away, and parts shown schematically illustrating a canister type vacuum cleaner and an exemplary embodiment of a vacuum cleaner hose assembly used therewith;

FIG. 2 is a greatly enlarged view with parts in elevation, parts in cross section, and parts broken away particularly illustrating the male hose connector of the vacuum hose assembly of FIG. 1 and a protective device installed therein; and FIG. 3 is a view looking perpendicularly toward the pins of a male electrical connector which comprises the hose connector of FIG. 2.

DETAILED DESCRIPTION

Reference is now made to FIG. 1 of the drawing which illustrates an exemplary canister type vacuum cleaner which is designated generally by the reference numeral 10 and utilizes one exemplary embodiment of a vacuum hose assembly 11 of this invention. The vacuum cleaner 10 has a so-called canister or vacuum tank 12 which is provided with a vacuum tube 13 which extends outwardly from the top portion 14 thereof. The vacuum cleaner 10 is provided with electrical power through a cord assembly 15 which is particularly adapted to be plugged in a known manner into a suitable power source. The cleaner 10 has an integral vacuum unit which is provided in accordance with techniques known in the art and because such vacuum unit is of conventional construction it will not be shown or described.

The vacuum cleaner has a female receptacle 16 disposed on the outside surface of its tank 12 for ready access thereto; and, the receptacle 16 is used to supply electrical power through suitable electrical means in the hose assembly 11 to an electric motor 17 which is used to drive a cleaning instrument 20 which is operatively connected to the hose assembly 11. The vacuum cleaner 10 has an electrical cord assembly 21 which is provided with a male fitting 22 at one end thereof for connection to the fitting 16 and the cord assembly 21 has a female fitting 23 at its opposite end which is adapted to be electrically connected to the hose assembly 11 once the assembly 11 is connected to the tank 12; and, as will be described in detail subsequently.

The hose assembly 11 comprises a vacuum hose 24 and a pair of hose connectors 25 and 26 provided at opposite end portions of the hose 24. The hose connectors 25 and 26 may be fixed on opposite end portions of the vacuum hose 24 utilizing any suitable technique known in the art and preferably such hose connectors are molded in position to define the hose assembly 11 as an integral unit.

The hose assembly 11 also has a plurality of wires, and in this example of the invention a pair of wires 27 and 28 which extend along the vacuum hose 24; and, the wires 27 and 28 serve the dual purpose of electrical conductors and hose reinforcing wires as is known in the art. Each of the dual-purpose wires 27 and 28 consists of a central member 29 which is suitably coated or covered with an associated insulating sleeve which is designated by the same reference numeral 30 for each wire 27 and 28. Each central member is preferably made of a ferrous metal, or the like, and is clad with a material, such as copper, which has better electrical conductivity than the ferrous metal. In addition to conducting electricity from one end of the hose assembly 11 to the other the wires 27 and 28 prevent collapse of the vacuum hose 11 and as is known in the art.

The hose assembly 11 has an electrical connector associated with each of its hose connectors. In this example of the invention a male electrical connector 32, having contacts 32A and 32B, is provided at one end of the hose assembly 11 and a female electrical connector 33 is provided at the opposite end of the hose assembly 11. The electrical connectors 32 and 33 are defined as an integral part of their associated hose connectors 25 and 26 respectively; and, the electrical connectors 32 and 33 are readily accessible and supported by their hose connectors as is known in the art.

The hose assembly 11 has the improvement therein in accordance with the teachings of this invention which comprises a chamber, which is designated generally by the reference numeral 35, in at least one of the hose connectors; and, in this example of the invention the chamber 35 is provided in the male hose connector 25 thereof which is adapted to be operatively connected to the tube 13 extending from tank 12 of the vacuum cleaner 10. The hose assembly 11 also has a readily opened and closed access means designated generally by reference numeral 36 for the chamber 35 and a protective device which is designated generally by the reference numeral 37 disposed within the chamber 35.

The device 37 is suitably electrically connected, by any suitable electrical connection means known in the art, between an associated electrical connector and the wires 27 and 28. In this example, the device 37 is connected between male electrical connector 32 and the wires 27 and 28.

The device 37 is preferably of the type disclosed in the previously mentioned U.S. Pat. No. 3,493,815, the disclosure of which is incorporated herein by reference thereto. The device 37 is sensitive to and serves to detect practically every type of fault capable of causing injury to humans and such device operates to interrupt the circuit therethrough, i.e., through such device 37, upon detection of such a fault. The detailed construction and operation of the device 37 and the various faults which serve to actuate same are disclosed in Pat. No. 3,493,815 and thus will not be repeated herein.

As will be readily apparent from FIG. 2, the chamber 35 is a substantially right circular cylindrical chamber and has one open end 40. The access means 36 comprises thread means, shown in this example as female threads 41 in the hose connector 25, and a threaded closure member 42. The female threads 41 adjoin the open end 40 of the chamber 35; and, the closure member 42 has cooperating thread means shown as cooperating male threads 43 which are adapted to be threadedly engaged with the female threads 41.

The closure member 42 is basically in the form of a threaded plug; and, in the plug 42 has a projection 44 extending outwardly from its outside surface. The projection 44 is particularly adapted to be grasped either manually or with a standard hand tool to facilitate installation and removal of the plug 42.

The device 37 is a cartridge which is readily removed and installed and such cartridge has a substantially right circular cylindrical configuration which includes an outside cylindrical surface 45. The surface 45 is particularly adapated to be disposed substantially flush with the inside cylindrical surface 46 which comprises the inside surface of the chamber 35.

The cartridge 37 may also be provided with suitable means which assure that the cartridge is only installed within its chamber 35 in only one position or orientation. In this embodiment the cartridge 37 is provided with a locating pin 47 at the inner end thereof which is adapted to be received within an integral recess 48 in the bottom of the chamber 35. The construction and arrangement of the pin 47 and recess 48 are such that unless the pin 47 is received in the recess 48, the closure plug 42 cannot be threaded fully into position. The locating pin 47 is located at a predetermined position on the inner end wall 49 of the cartridge to assure that means electrically connecting the cartridge 37 between the male electrical connector 32 and wires 27 and 28 are in the precise desired alignment to assure the required electrical contact. Further, the electrical connection means comprising components on the cartridge 37 and other components on the hose connector 25 are such that unless the cartridge is fully seated in its chamber with the plug in position, the remote cleaning instrument 20 can not be operated.

In particular, the electrical means electrically connecting the cartridge between the electrical connector 32 and the wires 27 and 28 is designated generally by the reference numeral 50 (FIG. 2) and comprises a pair of contact members 51 and 52 suitably electrically connected to associated wires 27 and 28. Each member 51 and 52 is a springlike outwardly convex member which is supported by the hose connector 25 and extends into chamber 35 from surface 46 and is partially yieldingly flattened once it is engaged by a contacting member thereby assuring a firm electrical contact. The members 51 and 52 are adapted to be engaged by a first set of cooperating contact members 53 and 54 provided on the outside surface of the cartridge 37. Similarly, the electrical connection means comprises a pair of contact members 55 and 56 which are similar to members 51 and 52 and each is also supported by the hose connector 25 and also extends into the chamber 35 and each operates in a similar manner as the members 51–52. The members 55 and 56 are suitably electrically connected to contact pins 32A and 32B respectively of the electrical connector 32. The members 55 and 56 are adapted to be engaged by another set of cooperating circuit members 57 and 58 respectively on the cartridge 37.

The dimensional relationships between the components 51, 52 and 53, 54 and the components 55, 56 and 57, 58 is such that a firm non-arcing electrical connection is provided therebetween. It will also be appreciated that these various members are made of materials which provide optimum electrical conductivity and the spring-like members 51–52 and 55–56 are capable of providing an extended service life.

Thus, it is seen that in accordance with the teachings of this invention a vacuum cleaner, a vacuum hose assembly utilized on such vacuum cleaner, and a method of making a vacuum hose assembly are provided wherein a special protective device is uniquely provided in a hose connector for ready access and such device consists of a cartridge 37 which is sensitive to and serves to detect practically every type of fault capable of causing injury to humans. The cartridge 37 operates to interrupt the electrical circuit therethrough upon detection of such a fault and thereby prevents injury.

The chamber 35 for receiving the cartridge 37 is preferably provided in the hose connector which is connected to the vacuum tank, hose connector 25 in this example. Further, the forming of the chamber 35 and the disposal and support of the various electrical components in such chamber are preferably achieved simultaneously with the molding of the hose connector on the vacuum hose 24.

The device or cartridge 37 may be of an expendible type and made of comparatively inexpensive components so that once it has operated, the whole unit must be replaced. However, to provide the device 37 at minimum cost, and optimum quality, such device may be constructed utilizing components which are readily assembled and disassembled for repair thereof by a service dealer.

While present exemplary embodiments of this invention, and methods of practicing the same, have been illustrated and described, it will be recognized that this invention may be otherwise variously embodied and practiced within the scope of the following claims.

What is claimed is:

1. In a canister type vacuum cleaner comprising a vacuum hose assembly; said vacuum hose assembly comprising a vacuum hose; a pair of hose connectors provided at opposite end portions of said hose; a pair of wires extending along said vacuum hose and serving the dual purpose of electrical conductors and hose reinforcing wires; and an electrical connector associated with each hose connector and having said dual purpose wires connected thereto; the improvement comprising, a chamber in at least one of said hose connectors, readily opened and closed access means for said chamber, a protective cartridge within said chamber, said cartridge being adapted to be easily installed within and removed from said chamber, electrical connection means electrically connecting said cartridge between an associated electrical connector and said wires, said cartridge being sensitive to and serving to detect practically every type of fault capable of causing injury to humans and operating to interrupt the electrical circuit therethrough upon detection of a fault, and means for installing said cartridge within said chamber in only one operative position at which said cartridge enables operation of a cleaning instrument supplied with electrical power by said wires.

2. A vacuum cleaner as set forth in claim 1 in which said cartridge is an expendible cartridge.

3. A vacuum cleaner as set forth in claim 2 in which said cartridge has a substantially right circular cylindrical configuration.

4. A vacuum cleaner as set forth in claim 2 in which said chamber is a substantially right circular cylindrical chamber having one open end and said access means comprises thread means in said one hose connector adjoining said open end and a closure member having cooperating thread means which are adapted to be threaded in said thread means in said one hose connector.

5. A vacuum cleaner as set forth in claim 4 in which said thread means in said one hose connector comprise female threads, said closure member is defined as a plug, and said cooperating thread means comprise male threads on said plug which are adapted to be threadedly engaged with said female threads.

6. A vacuum cleaner as set forth in claim 5 and further comprising a projection extending from said plug, said projection being particularly adapted to facilitate installation and removal of said plug.

7. A vacuum cleaner as set forth in claim 4 in which said electrical connection means comprises yielding contact members carried by said one hose connector and disposed within said chamber.

8. A vacuum cleaner as set forth in claim 7 in which said hose connectors are made of synthetic plastic material enabling easy forming of said chamber therein.

9. In a method of making a vacuum hose assembly for a canister type vacuum cleaner comprising the steps of; providing a vacuum hose; forming a pair of hose connectors at opposite end portions of said hose; extending a pair of wires along said vacuum hose; said wires serving the dual purpose of electrical conductors and hose reinforcing wires; and attaching an electrical connector at each end of said dual-purpose wires while supporting each electrical connector in an associated hose connector; the improvement comprising, forming a chamber in at least one of said hose connectors, providing readily opened and closed access means for said chamber, installing a protective cartridge within said chamber while simultaneously electrically connecting same between an associated electrical connector and said wires, said cartridge being adapted to be easily installed within and removed from said chamber, said device being sensitive to and serving to detect practically every type of fault capable of causing injury to humans and operating to interrupt the circuit therethrough upon detection of a fault, and providing means for installing said cartridge within said chamber in only one operative position at which said cartridge enables operation of a cleaning instrument supplied with electrical power by said wires.

10. A method as set forth in claim 9 in which said step of forming said hose connectors comprises the step of molding said hose connectors and said step of forming said chamber comprises forming said chamber during said molding step.

11. In a vacuum hose assembly for a canister type vacuum cleaner; said vacuum hose assembly comprising a vacuum hose; a pair of hose connectors provided at opposite end portions of said hose; and a pair of wires extending along said vacuum hose and serving the dual purpose of electrical conductors and hose reinforcing wires; and an electrical connector associated with each hose connector and having said dual-purpose wires connected thereto; the improvement comprising, a chamber in at least one of said hose connectors, readily opened and closed access means for said chamber, a protective cartridge within said chamber, said cartridge being adapted to be easily installed within and removed from said chamber, electrical connection means electrically connecting said cartridge between an associated electrical connector and said wires, said cartridge being sensitive to and serving to detect practically every type of fault capable of causing injury to humans and operating to interrupt the electrical circuit therethrough upon detection of a fault, and means for installing said cartridge within said chamber in only one operative position at which said cartridge enables operation of a cleaning instrument supplied with electrical power by said wires.

12. A hose assembly as set forth in claim 11 in which said cartridge is an expendible cartridge.

13. A hose assembly as set forth in claim 12 in which said cartridge has a substantially right circular cylindrical configuration.

14. A hose assembly as set forth in claim 11 in which said chamber is a substantially right circular cylindrical chamber having one open end and said access means comprises thread means in said one hose connector adjoining said open end and a closure member having cooperating thread means which are adapted to be threaded in said thread means in said one hose connector.

15. A hose assembly as set forth in claim 14 and further comprising means on said closure member for facilitating installation and removal thereof.

16. A hose assembly as set forth in claim 15 in which said electrical connection means comprises yielding contact members carried by said one hose connector and disposed within said chamber.

* * * * *